(12) United States Patent
Balasubramanian et al.

(10) Patent No.: US 9,158,536 B2
(45) Date of Patent: Oct. 13, 2015

(54) PROGRAM CODE LIBRARY CONSOLIDATION IN AN INTEGRATED DEVELOPMENT ENVIRONMENT

(71) Applicant: International Business Machines Corporation, Armonk, NY (US)

(72) Inventors: Swaminathan Balasubramanian, Troy, MI (US); Rick A. Hamilton, II, Charlottesville, VA (US); Brian M. O'Connell, Research Triangle Park, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 13/706,503

(22) Filed: Dec. 6, 2012

(65) Prior Publication Data

US 2014/0165031 A1 Jun. 12, 2014

(51) Int. Cl.
*G06F 9/44* (2006.01)
(52) U.S. Cl.
CPC .......................................... *G06F 8/72* (2013.01)
(58) Field of Classification Search
None
See application file for complete search history.

(56) References Cited

U.S. PATENT DOCUMENTS

| | | | |
|---|---|---|---|
| 7,216,332 B2 | 5/2007 | Smith | |
| 7,383,269 B2 | 6/2008 | Swaminathan et al. | |
| 7,490,319 B2* | 2/2009 | Blackwell et al. | 717/124 |
| 7,805,459 B2 | 9/2010 | Polk | |
| 7,844,949 B2 | 11/2010 | Clemm et al. | |
| 7,886,285 B2 | 2/2011 | Asselin et al. | |
| 7,937,685 B2* | 5/2011 | Weil et al. | 717/103 |
| 7,949,992 B2* | 5/2011 | Andreev et al. | 717/104 |
| 8,020,146 B2* | 9/2011 | Hudson, Jr. | 717/120 |
| 8,122,017 B1* | 2/2012 | Sung et al. | 707/723 |
| 8,141,038 B2 | 3/2012 | O'Connell et al. | |
| 8,359,574 B1* | 1/2013 | Bannur et al. | 717/120 |
| 8,572,560 B2* | 10/2013 | Drissi et al. | 717/120 |
| 8,819,617 B1* | 8/2014 | Koenig et al. | 717/101 |
| 2008/0201330 A1 | 8/2008 | Bloesch | |
| 2008/0222631 A1* | 9/2008 | Bhatia et al. | 717/178 |

(Continued)

OTHER PUBLICATIONS

Otavio Augusto Lazzarini Lemos, Sushil Bajracharya, Joel Ossher, Paulo Cesar Masiero, Cristina Lopes, "A test-driven approach to code search and its application to reuse of auxiliary functionality", 2010, Elsevier B.V., (Whole Document).*

(Continued)

*Primary Examiner* — Don Wong
*Assistant Examiner* — Roberto E Luna
(74) *Attorney, Agent, or Firm* — William E. Schiesser; Keohane & D'Alessandro PLLC; Hunter E. Webb

(57) ABSTRACT

An approach for integrated development environment (IDE)-based program code library consolidation in a networked computing environment (e.g., a cloud computing environment) is provided. Under this approach, it may be determined whether to consolidate a first set of program code libraries in an integrated development environment (IDE). The determination may be based on consolidation criteria applicable to the first set of program code libraries. Based on the determination, the first set of program code libraries may be consolidated based on a set of consolidation preferences and a set of consolidation rules to yield a second set of program code libraries. An ordered list identifying the second set of program code libraries may then be generated.

22 Claims, 5 Drawing Sheets

(56) References Cited

U.S. PATENT DOCUMENTS

2011/0219359 A1* 9/2011 Gupta .......................... 717/124
2012/0324417 A1* 12/2012 Somani et al. ................ 717/101

OTHER PUBLICATIONS

Maitland, J., "Keeping Control Isn't Easy", Chapter 4: Cloud-Based Infrastructure, SearchCloudComputing.com, 13 pages.
Mell, P. et al., "The Nist Definition of Cloud Computing", National Institute of Standards and Technology, Information Technology Laboratory, Vers. 15, Oct. 7, 2009, 2 pages.
Van Zyl, J., "Getting Started with Maven Repository Management", 4 pages.
Maitland, J., "Keeping Control Isn't Easy", Chapter 4: Cloud-Based Infrastructure, SearchCloudComputing.com, Publication Date: Oct. 2009, 19 pages.
Van Zyl, J., "Getting Started with Maven Repository Management", 2010, 7 pages.

* cited by examiner

PROGRAM CODE LIBRARY CONSOLIDATION IN AN INTEGRATED DEVELOPMENT ENVIRONMENT

TECHNICAL FIELD

Embodiments of the present invention relate to program code library consolidation. Specifically, embodiments of the present invention relate to an approach for integrated development environment (IDE)-based program code library consolidation in a networked computing environment (e.g., a cloud computing environment).

BACKGROUND OF THE INVENTION

A code repository is typically a searchable, categorized, and/or Internet accessible location that users may access to browse, search, and download source or compiled library code. Uses of code repositories may include open source projects, proprietary development projects, and/or projects that create libraries for later use. A code annotation is a special form of syntactic metadata that can be added to source code. Classes, methods, variables, parameters, and/or code packages may be annotated. Unlike comments, annotations may be actionable in that they may be embedded in files generated by a compiler, and may be utilized by an execution environment to be retrievable at run-time. A code library is a collection of resources used to develop software. Such resources may include pre-written code and subroutines, classes, values, or type specifications. Code libraries may contain program code and/or data that provide services to independent programs. Such an implementation allows for program code and/or data to be shared and changed in a modular fashion. Challenges may exist, however, when a search of code libraries results in multiple code libraries being identified. Specifically, it may be difficult to efficiently and/or accurately select a particular program code library from within an IDE.

SUMMARY

In general, embodiments of the present invention provide an approach for integrated development environment (IDE)-based program code library consolidation in a networked computing environment (e.g., a cloud computing environment). Under this approach, it may be determined whether to consolidate a first set of program code libraries in an integrated development environment (IDE). The determination may be based on consolidation criteria applicable to the first set of program code libraries. Based on the determination, the first set of program code libraries may be consolidated based on a set of consolidation preferences and a set of consolidation rules to yield a second set of program code libraries. An ordered list identifying the second set of program code libraries may then be generated.

A first aspect of the present invention provides a computer-implemented method for consolidating program code libraries in a networked computing environment, comprising: determining whether to consolidate a first set of program code libraries in an integrated development environment (IDE), the determining being based on consolidation criteria applicable to the first set of program code libraries; consolidating, responsive to the determining, the first set of program code libraries based on a set of consolidation preferences and a set of consolidation rules to yield a second set of program code libraries; and generating an ordered list identifying the second set of program code libraries.

A second aspect of the present invention provides a system for consolidating program code libraries in a networked computing environment, comprising: a memory medium comprising instructions; a bus coupled to the memory medium; and a processor coupled to the bus that when executing the instructions causes the system to: determine whether to consolidate a first set of program code libraries in an integrated development environment (IDE), the determining being based on consolidation criteria applicable to the first set of program code libraries; consolidate, responsive to the determination, the first set of program code libraries based on a set of consolidation preferences and a set of consolidation rules to yield a second set of program code libraries; and generate an ordered list identifying the second set of program code libraries.

A third aspect of the present invention provides a computer program product for program code library consolidation in a networked computing environment, the computer program product comprising a computer readable storage media, and program instructions stored on the computer readable storage media, to: determine whether to consolidate a first set of program code libraries in an integrated development environment (IDE), the determining being based on consolidation criteria applicable to the first set of program code libraries; consolidate, responsive to the determination, the first set of program code libraries based on a set of consolidation preferences and a set of consolidation rules to yield a second set of program code libraries; and generate an ordered list identifying the second set of program code libraries.

A fourth aspect of the present invention provides a method for deploying a system for consolidating program code libraries in a networked computing environment, comprising: providing a computer infrastructure being operable to: determine whether to consolidate a first set of program code libraries in an integrated development environment (IDE), the determining being based on consolidation criteria applicable to the first set of program code libraries; consolidate, responsive to the determination, the first set of program code libraries based on a set of consolidation preferences and a set of consolidation rules to yield a second set of program code libraries; and generate an ordered list identifying the second set of program code libraries.

BRIEF DESCRIPTION OF THE DRAWINGS

These and other features of this invention will be more readily understood from the following detailed description of the various aspects of the invention taken in conjunction with the accompanying drawings in which.

Figure 1:
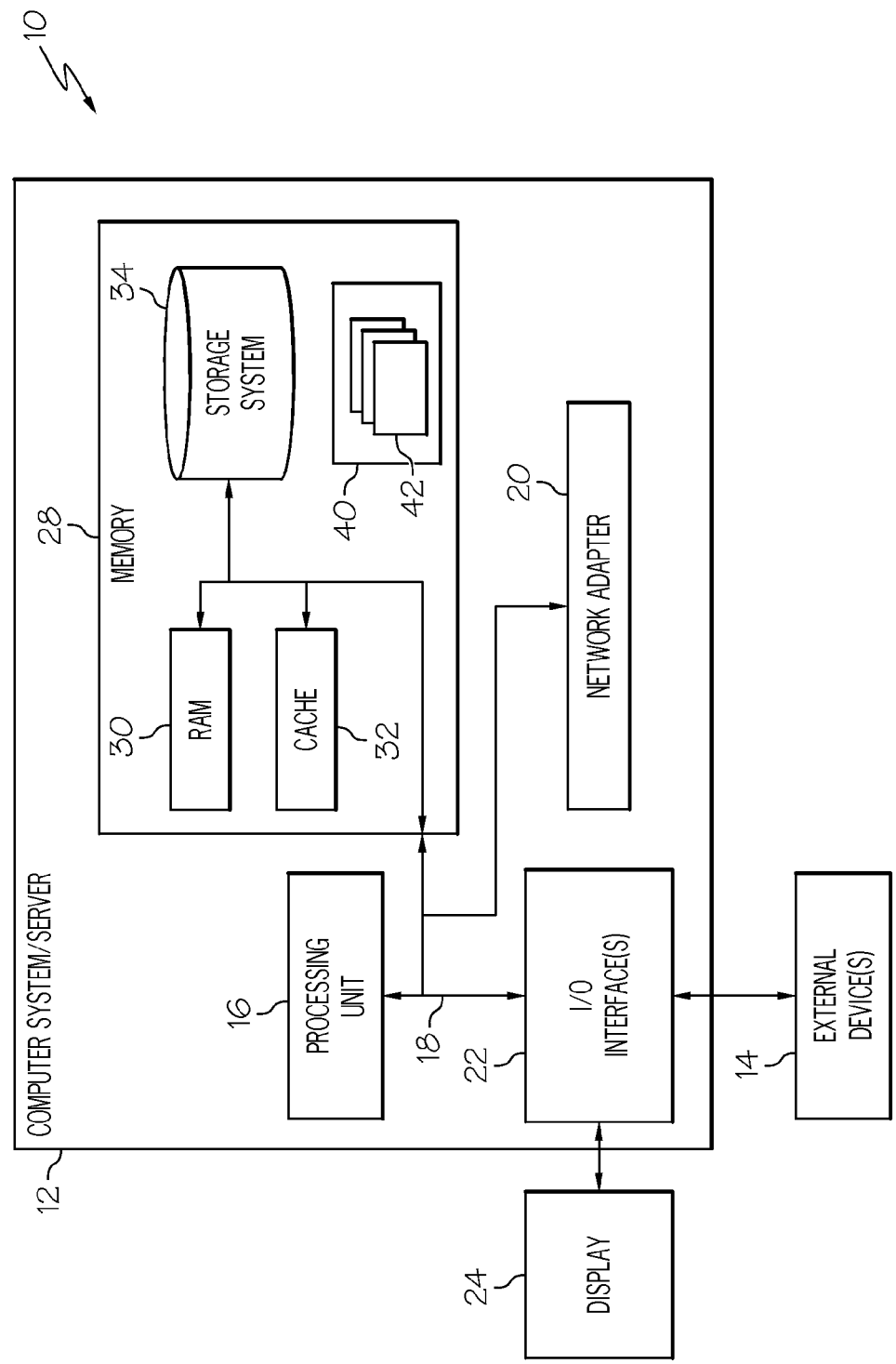
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for integrated development environment (IDE)-based program code library consolidation in a networked computing environment (e.g., a cloud computing environment). Under this approach, it may be determined whether to consolidate a first set of program code libraries in an integrated development environment (IDE). The determination may be based on consolidation criteria applicable to the first set of program code libraries. Based on the determination, the first set of program code libraries may be consolidated based on a set of consolidation preferences and a set of consolidation rules to yield a second set of program code libraries. An ordered list identifying the second set of program code libraries may then be generated.

In a typical embodiment, code repositories and integrated development environments (IDEs) are augmented to provide enhanced searching. In an alternate embodiment, the teachings recited herein may be implemented by search engines rather than development environments. The embodiments of the present invention may further augment annotation systems to support tag-based descriptions of methods and classes. Still yet, in embodiments in which source code is available in addition to runtime libraries, descriptive tags may be automatically generated using known search indexing methodology. Furthermore, searching is refined through the use of an expectation annotation. It is understood that embodiments of the present invention may utilize code annotations (e.g., to program code, methods, classes, etc.) to express related attributes. A code annotation is a special form of syntactic metadata that can be added to source code. Classes, methods, variables, parameters, and/or code packages may be annotated. Unlike comments, annotations may be actionable in that they may be embedded in files generated by a compiler, and may be utilized by an execution environment to be retrievable at run-time.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, mobile devices, global positioning systems (GPS), GPS-enable devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, which perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program code library consolidation program/utility 40, having a set (at least one) of program modules 42, may be stored in memory 28 by way of example, and not limitation, as well as an operating system, one or more application programs, other program modules, and program data. In general, library consolidation program 40 performs the function of the present invention as described herein. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
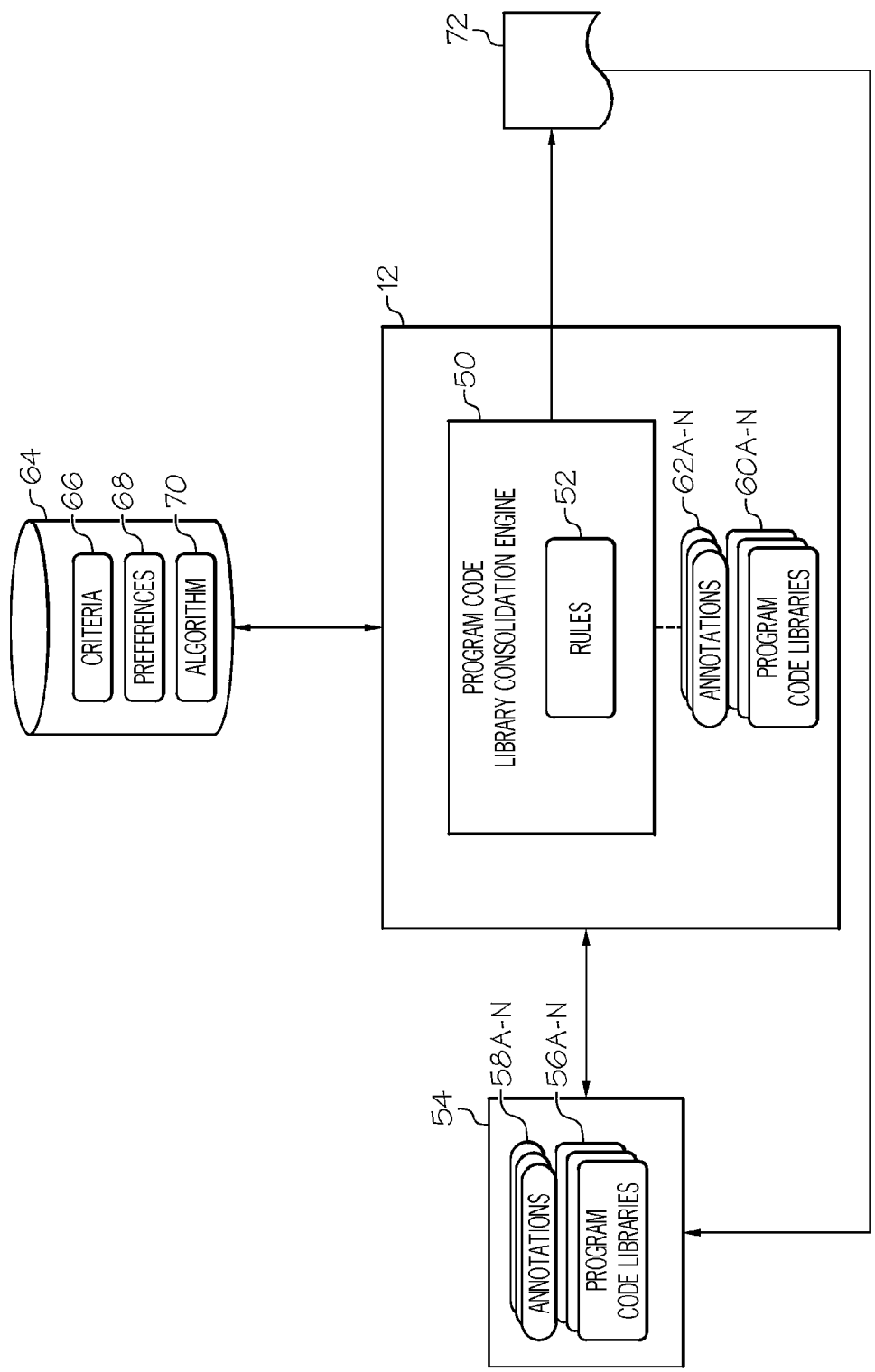
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment (e.g., a cloud computing environment). A computer system/server 12, which can be implemented as either a stand-alone computer system, or as a networked computer system is shown in FIG. 2. In the event the teachings recited herein are practiced in a networked computing environment (e.g., a cloud computing environment), each client need not have a program code library consolidation engine (engine 50). Rather, engine 50 could be loaded on a server (e.g., payment processing server) or server-capable device that communicates (e.g., wirelessly) with the clients to provide library consolidation functionality hereunder. Regardless, as depicted, engine 50 is shown within computer system/server 12. In general, engine 50 can be implemented as program/utility 40 on computer system 12 of FIG. 1 and can enable the functions recited herein. As further shown, engine 50 (in one embodiment) comprises a rules and/or computational engine that processes a set (at least one) of rules/logic 52 and/or provides library consolidation functionality hereunder.

Along these lines, engine 50 may perform multiple functions similar to a general-purpose computer. Specifically, among other functions, engine 50 may (among other things): determine whether to consolidate a first set of program code libraries 58A-N in an integrated development environment (IDE) 54, the determining being based on consolidation criteria 66 (e.g., multiple library selections, library updates, library removals, or new library detection) applicable to the first set of program code libraries 56A-N and/or annotations/headers 58A-N associated therewith; consolidate, responsive to the determining, the first set of program code libraries 56A-N based on a set of consolidation preferences 68 (stored in computer storage device 64) and a set of consolidation rules (e.g., rules 52) to yield a second set of program code libraries 60A-N (e.g., comprising a subset of the first set of program code libraries) having annotations 62A-N; apply a consolidation algorithm 70 to the set of consolidation preferences 66 and set of consolidation rules (e.g., rules 52); assign and weight scores to the first set of program code libraries 56A-N against the set of consolidation rules (e.g., rules 52); generate a data matrix/structure identifying program code usage of the first set of program code libraries; and/or generate an ordered list 72 identifying the second set of program code libraries (e.g., based on the weighted scores) 60A-N.

It is understood that the example shown in FIG. 2 is intended to be illustrative only. For example, engine 50 could be loaded in IDE 54, or operate on a separate system as shown. Along these lines, engine 50 may have access to IDE 56A-B to perform the functions recited hereunder. It is thus understood that the precise architectural implementation shown in FIG. 2 is not intended to be limited and that similar underlying functionality may be achieved with various architectures.

Figure 3:
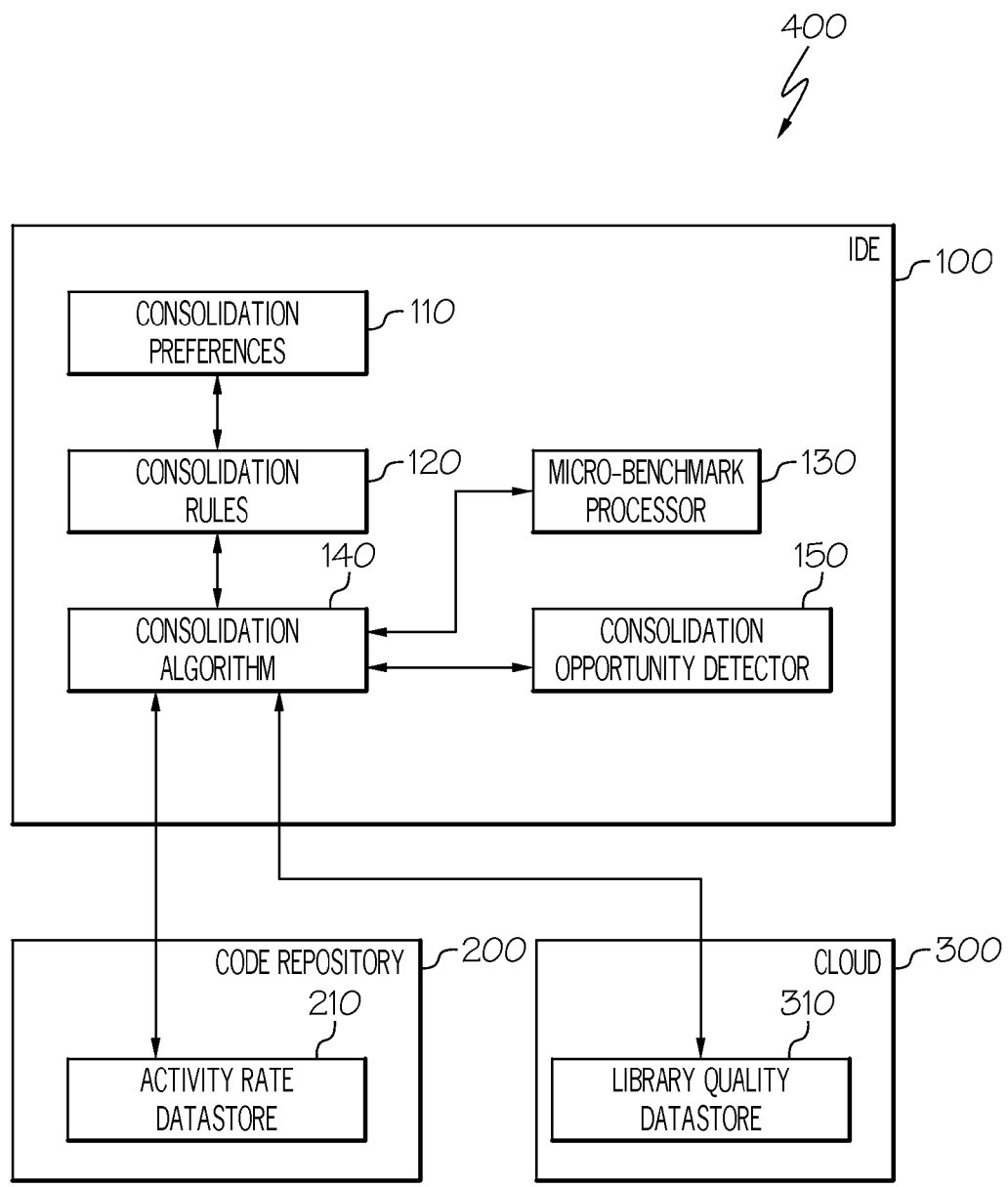
FIG. 3 depicts a more detailed diagram of the system of FIG. 2 according to an embodiment of the present invention.

Referring now to FIG. 3, a more detailed diagram of program 40 (FIG. 1) and/or engine 50 (FIG. 2) is shown. Specifically, FIG. 3 depicts program 40/engine 50 implemented via an IDE 100, code repository 200, and cloud 300 connected via connection 400. In one embodiment, connection 400 may represent a cloud network. Code repository 200 comprises activity rate datastore 210 that tracks a rate of changes occurring within a program code library. In another embodiment, this rate may be measured by the number of minor or major releases of the library within a unit of time. Cloud 300 comprises library quality datastore 310 that may provide a quality rating for a program code library based (on but not limited to) a number of defects identified and/or user feedback. IDE 100 comprises consolidation preferences 110, consolidation rules 120, consolidation algorithm 140, micro-benchmark processor 130, and consolidation opportunity detector 150. When a consolidation opportunity is detected by consolidation opportunity detector 150, the algorithm 140 may be invoked. Algorithm 140 may use consolidation rules 120 along with micro-benchmark processor 130, activity rate data store 210 and library quality data store 310 to determine the consolidated library list. The algorithm's functions may be controlled by preferences (e.g., developer preferences) maintained within consolidation preferences 110.

Illustrative Embodiment

This section will describe various functions (e.g., via method, functions and/or modules) performed by engine 50 according to an illustrative example hereunder.

Consolidation Opportunity Detection

This module/function determines whether there is an opportunity for consolidation. Consolidation opportunities may be triggered by one of many factors including, but not limited to: a selection of more than one program code library during a previous search, exclusion reason invalidation, new library detection, etc.

Multiple Library Selection: If multiple invocations of a search occur and different libraries are selected, this method may be implemented. Upon invocation, this method may invoke the consolidation algorithm described below.

Exclusion Reason Invalidation: During selection of matching libraries, users may optionally select or annotate why they are not using certain libraries. Such annotations may remain within the source code and are considered the exclusive reason for various libraries. This method may further analyze those reasons and discern if such reasons are no longer applicable.

New Library Detection: If a new program code library is detected through automatic re-searching, and that program code library contains the features used and present in multiple libraries, the consolidation algorithm below may be invoked.

Consolidation Algorithm

This function consolidates library selection across multiple invocations of program code library search and/or selection functions. Library consolidation may occur when multiple libraries have been selected using the aforementioned searching method. This function further examines the entirety of all code selection annotations throughout the project and discerns if multiple library selections may be consolidated into fewer libraries while still meeting the requirements specified in the annotations. For instance, assume that one may opt to exclude a library because its distribution size exceeds a specified threshold. However, if subsequent invocations of selection methods have resulted in choosing multiple libraries that, combined, exceed the size of the excluded library and the excluded library contains the features selected in those previous libraries, the exclusion reason may now be invalid. This function may then invoke the consolidation algorithm.

Consolidation Rules

The algorithm for consolidation may include (but is not limited to) the following rules: feature matches, library size, open source versus commercial program code libraries, micro-benchmarking comparison, program code library enhancement or activity rate, and/or program code library quality indicator.

Feature Matches: When looking at the entirety of all code selection annotations throughout the project, this rule may analyze the number of feature matches. The definition of a feature match may be language specific. For example, in the Java programming language, a feature match may be defined as a match of annotations for a single method.

Library Size: Given a threshold, this rule may determine if the addition of the library causes the distribution to exceed the threshold.

Open Source versus Commercial Program Code Libraries: If, during multiple library selection or new library detection operations it is determined that both open source and commercial libraries exist delivering the same function, the consolidation algorithm may be triggered. While open source libraries may be preferred over commercial libraries because of cost benefit, on occasions commercial libraries may be advantageous for other reasons. In an embodiment, a developer may specify a preference of open source over commercial. Further, this preference may be project specific, or library specific. For instance, a particular party may find it advantageous to use libraries open sourced to a particular foundation. On the other hand, a different party may determine that open source libraries offered and/or promoted by certain foundations to be disadvantageous.

Micro-benchmarking Comparison: When multiple program code libraries are found across multiple search invocations, or when a new program code library is detected, the micro-benchmark ranking feature may be executed on all matches to determine the highest performing program code library.

Library Enhancement or Activity Rate: This rule analyses the rate at which the library being used is being updated. In general, a more actively enhanced program code library is a better choice. If multiple program code libraries are being used, or if a new program code library is detected, a comparison may be made of the enhancement rate to determine if consolidation is required.

Library Quality Indicator: This rule analyzes the quality of the program code library being used. The quality indicator may be obtained from a plurality of sources including publicly available bug reports, peer quality feedback, etc.

Consolidation Preferences

While analyzing different parameters to determine if consolidation is required, the developer may control the outcome by assigning relative importance to each parameter. For instance, a relatively high performing commercial program code library may be less preferable over a lower performing open source program code library as long as the performance difference is within a threshold. Similarly, a highly active program code library may not be preferred if the overhead of integrating an update into an application in production is relatively more costly. This feature scores each program code library against each rule and determines the final score using a weighting scale.

Consolidation Algorithm

The consolidation algorithm combines rules and preferences that may be described using the following steps. It is understood that these steps are illustrative only and that other variations may be implemented hereunder:

(1) Initialize output list
(2) Select libraries with single method match and add to output list
(3) Repeat for remaining program code libraries/methods
(4) Organize remaining methods and libraries in a matrix
(5) Repeat for each method
(6) Place X on each method/library cell where there is a match
(7) Score each program code library against each rule
(8) Scale scores according to user selected importance
(7) Sum scores
(8) Select program code library with highest sum and add to output list
(9) If output list does not satisfy all methods, return to step 3
(10) Stop Consider the following example wherein in one embodiment, the developer uses a psychometric scale (e.g., a "Likert" scale, a "Guttman" scale, etc.) to set up their weights for each rule as below. When using such a scale, the weighting may be allocated as: L1=0, L2=0.33, L3=0.66 and L4=1.0.

|  | (L1) Unimportant | (L2) Less Important | (L3) More Important | (L4) Most Important |
|---|---|---|---|---|
| Feature Matches |  | X |  |  |
| Library Size | X |  |  |  |
| Open Source versus Commercial |  | X |  |  |
| Micro-Benchmark Comparison |  |  |  | X |
| Library Activity Rate |  |  | X |  |
| Quality |  |  | X |  |

Further assume that in analyzing the entirety of all code selection annotations throughout a project, the following program code library usage matrix of methods may be created. In this example, Lib1 is open source, Lib2 is closed source (or commercial), Lib3 is open source but less preferable and Lib4 is open source. An 'X' indicates a match for a library/method combination.

|  | Lib1 | Lib2 | Lib3 | Lib4 |
|---|---|---|---|---|
| Method(1) | X | X | X |  |
| Method(2) |  | X | X | X |
| Method(3) |  | X | X |  |
| Method(4) |  |  |  | X |
| Method(5) | X |  |  |  |

Next, individual libraries are scored for each rule. The scores for each rule are scaled to be between 0-100. For purposes of illustration, the following scores are used. It is noted that the scoring for each rule is defined by the parameters of that rule. For instance, feature matches may be percentage scores. As such, a score of 80 indicates 80% of the features are matched by the library. On the other hand, micro-benchmark comparison scores indicate relative performance, again scaled to 100. It may also be noted that a higher score indicates a better match against the rule. Scores shown below in parentheses are examples of raw scores.

|  | Lib1 | Lib2 | Lib3 | Lib4 |
|---|---|---|---|---|
| (A) Feature Matches | 10.89 (33) | 33 (100) | 33 (100) | 10.89 (33) |
| (B) Library Size | 0 | 0 | 0 | 0 |
| (C) Open Source versus Commercial | 33 (100) | 0 | 16.5 (50) | 100 (33) |
| (D) Micro-benchmark Comparison | 60 (60) | 50 (50) | 80 (80) | 40 (40) |
| (E) Library Activity Rate | 52.8 (80) | 26.4 (40) | 36.3 (55) | 39.6 (60) |
| (F) Quality | 39.6 (60) | 56.1 (85) | 36.3 (55) | 52.8 (80) |
| Total | 196.29 | 165.5 | 202.1 | 243.29 |

Regardless, with this example and using the algorithm steps outlined above, the consolidated library list comprises Lib1, Lib3, and Lib4.

Figure 4:
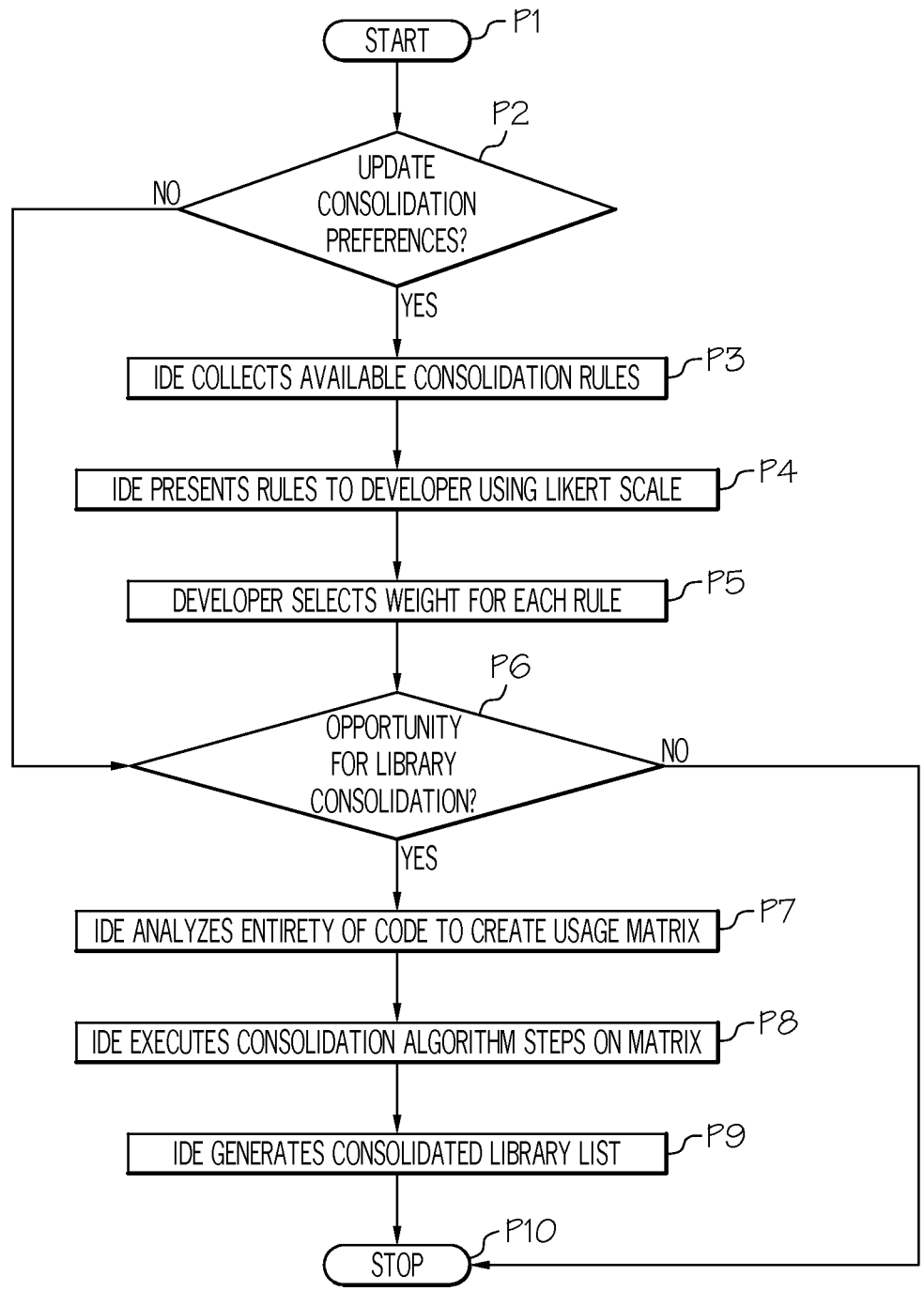
FIG. 4 depicts a method flow diagram according to an embodiment of the present invention.

Referring now to FIG. 4, a method flow diagram according to an embodiment of the present invention is shown. It is understood that any of these steps may be performed by engine 50 and/or IDEs hereunder (e.g., an IDE may utilize engine 50 and or incorporate engine 50 to perform these underlying functions). As depicted, in step P1, the process is started. In step P2, it is determined whether consolidation preferences are to be updated. If not, the process proceeds to step P6. If so, the IDE collects available consolidation rules in step P3 and presents rules to a developer using a psychometric scale (Guttman scale, Liked scale, etc.) or other scale or the like in step P4. In step P5, the developer selects the weight for each rule. In step P6, it is determined whether there is an opportunity for library consolidation. If not, the process ends in step P10. If so, the IDE analyzes the entirety of code to create a usage matrix in step P7. In step P8, the IDE executes the consolidation algorithm steps on the matrix. In step P9, the IDE generates a consolidated library list before the process is ended in step P10.

Figure 5:
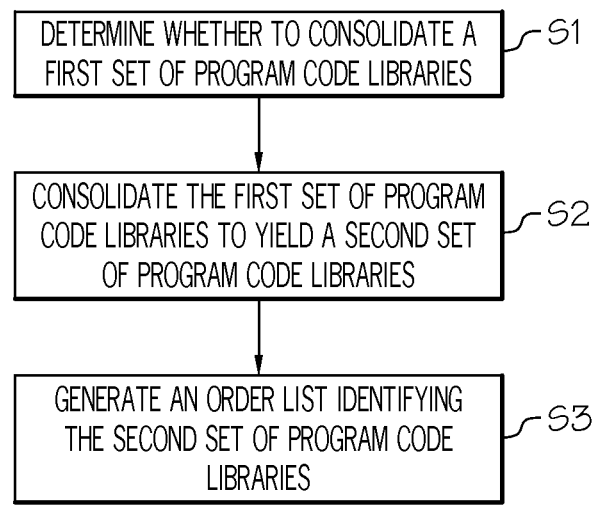
FIG. 5 depicts another method flow diagram according to an embodiment of the present invention.

Referring now to FIG. 5, another method flow diagram according to an embodiment of the present invention is shown (e.g., as enabled by engine 50 of FIG. 2). As depicted, in step S1, it is determined whether to consolidate a first set of program code libraries in an integrated development environment (IDE), the determining being based on consolidation criteria applicable to the first set of program code libraries. In step S2, responsive to the determining, the first set of program code libraries are consolidated based on a set of consolidation preferences and a set of consolidation rules to yield a second set of program code libraries. In step S3, an ordered list identifying the second set of program code libraries is generated.

While shown and described herein as an IDE-based program code library consolidation solution, it is understood that the invention further provides various alternative embodiments. For example, in one embodiment, the invention provides a computer-readable/useable medium that includes computer program code to enable a computer infrastructure to provide IDE-based program code library consolidation as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide IDE-based program code library consolidation functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for IDE-based program code library consolidation. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for consolidating program code libraries in a networked computing environment, comprising:
   determining whether to consolidate a first set of program code libraries in an integrated development environment (IDE), the determining being based on consolidation criteria applicable to the first set of program code libraries;
   consolidating, responsive to the determining, the first set of program code libraries based on a set of consolidation preferences and a set of consolidation rules to yield a second set of program code libraries, the consolidating including merging a first program code library of the first set of program code libraries and a second program code library of the first set of program code libraries to form a single merged program code library; and
   generating an ordered list identifying the second set of program code libraries.

2. The computer-implemented method of claim 1, the consolidating comprising applying a consolidation algorithm to the set of consolidation preferences and set of consolidation rules.

3. The computer-implemented method of claim 2, the consolidation algorithm comprising assigning scores to the first set of program code libraries against the set of consolidation rules.

4. The computer-implemented method of claim 3, the consolidation algorithm further comprising:
   weighting the scores; and
   generating a data matrix identifying program code usage of the first set of program code libraries.

5. The computer-implemented method of claim 4, the order list being generated based on the weighted scores.

6. The computer-implemented method of claim 1,
   wherein the determining is based on whether a feature in the first program code library is also present in the second program code library, and
   wherein the set of consolidation criteria being based on at least one of the following: multiple library selections, library updates, library removals, or new library detection.

7. The computer-implemented method of claim 1, the second set of program code libraries comprising a subset of the first set of program code libraries.

8. A system for consolidating program code libraries in a networked computing environment, comprising:
   a memory medium comprising instructions;
   a bus coupled to the memory medium; and
   a processor coupled to the bus that when executing the instructions causes the system to:
      determine whether to consolidate a first set of program code libraries in an integrated development environment (IDE), the determining being based on consolidation criteria applicable to the first set of program code libraries;
      consolidate, responsive to the determination, the first set of program code libraries based on a set of consolidation preferences and a set of consolidation rules to yield a second set of program code libraries, the consolidating including merging a first program code library of the first set of program code libraries and a second program code library of the first set of program code libraries to form a single merged program code library; and
      generate an ordered list identifying the second set of program code libraries.

9. The system of claim 8, the memory medium further comprising instructions for causing the system to apply a consolidation algorithm to the set of consolidation preferences and set of consolidation rules.

10. The system of claim 9, the memory medium further comprising instructions for causing the system to assign scores to the first set of program code libraries against the set of consolidation rules.

11. The system of claim 10, the memory medium further comprising instructions for causing the system to:
   weight the scores; and
   generate a data matrix identifying program code usage of the first set of program code libraries.

12. The system of claim 11, the order list being generated based on the weighted scores.

13. The system of claim 8,
wherein the determining is based on whether a feature in the first program code library is also present in the second program code library, and
wherein the set of consolidation criteria being based on at least one of the following: multiple library selections, library updates, library removals, or new library detection.

14. The system of claim 8, the second set of program code libraries comprising a subset of the first set of program code libraries.

15. A computer program product for program code library consolidation in a networked computing environment, the computer program product comprising a computer readable storage device, and program instructions stored on the computer readable storage device, to:
determine whether to consolidate a first set of program code libraries in an integrated development environment (IDE), the determining being based on consolidation criteria applicable to the first set of program code libraries;
consolidate, responsive to the determination, the first set of program code libraries based on a set of consolidation preferences and a set of consolidation rules to yield a second set of program code libraries, the consolidating including merging a first program code library of the first set of program code libraries and a second program code library of the first set of program code libraries to form a single merged program code library; and
generate an ordered list identifying the second set of program code libraries.

16. The computer program product of claim 15, the computer readable storage device further comprising instructions to apply a consolidation algorithm to the set of consolidation preferences and set of consolidation rules.

17. The computer program product of claim 16, the computer readable storage device further comprising instructions to assign scores to the first set of program code libraries against the set of consolidation rules.

18. The computer program product of claim 17, the computer readable storage device further comprising instructions to:
weight the scores; and
generate a data matrix identifying program code usage of the first set of program code libraries.

19. The computer program product of claim 18, the order list being generated based on the weighted scores.

20. The computer program product of claim 15,
wherein the determining is based on whether a feature in the first program code library is also present in the second program code library, and
wherein the set of consolidation criteria being based on at least one of the following: multiple library selections, library updates, library removals, or new library detection.

21. The computer program product of claim 15, the second set of program code libraries comprising a subset of the first set of program code libraries.

22. A method for deploying a system for consolidating program code libraries in a networked computing environment, comprising:
making available for use by another a computer infrastructure having at least one computer device that operates to:
determine whether to consolidate a first set of program code libraries in an integrated development environment (IDE), the determining being based on consolidation criteria applicable to the first set of program code libraries;
consolidate, responsive to the determination, the first set of program code libraries based on a set of consolidation preferences and a set of consolidation rules to yield a second set of program code libraries, the consolidating including merging a first program code library of the first set of program code libraries and a second program code library of the first set of program code libraries to form a single merged program code library; and
generate an ordered list identifying the second set of program code libraries.

\* \* \* \* \*